Figure 1:
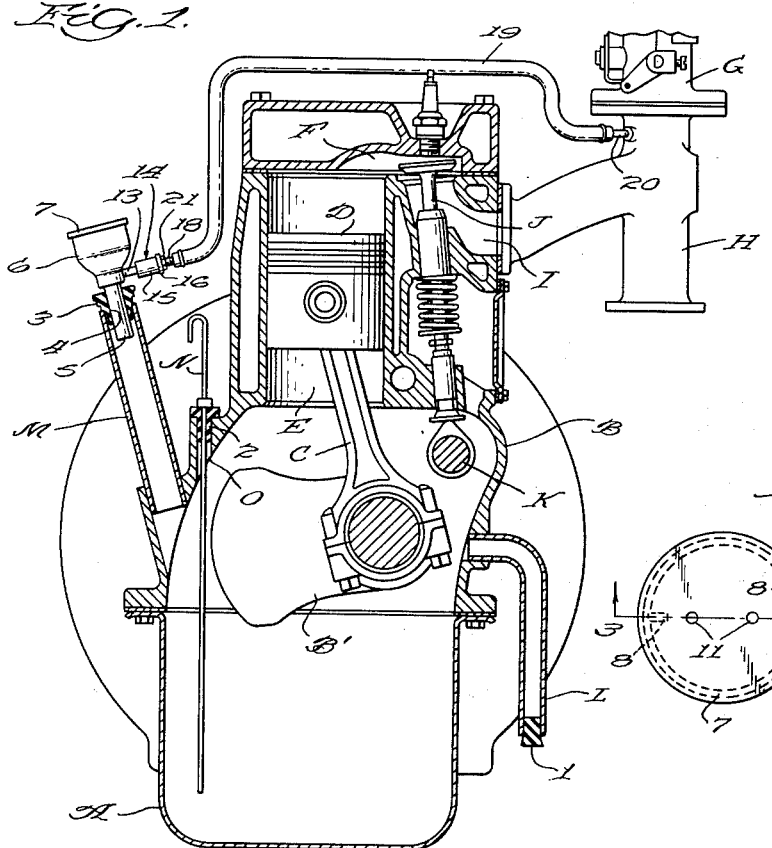

June 30, 1964 R. E. McMAHON 3,139,080
INTERNAL COMBUSTION ENGINE
Filed July 16, 1962 2 Sheets-Sheet 1

Inventor:
Robert E. McMahon.
By Harold J. L. Vescoute
Atty.

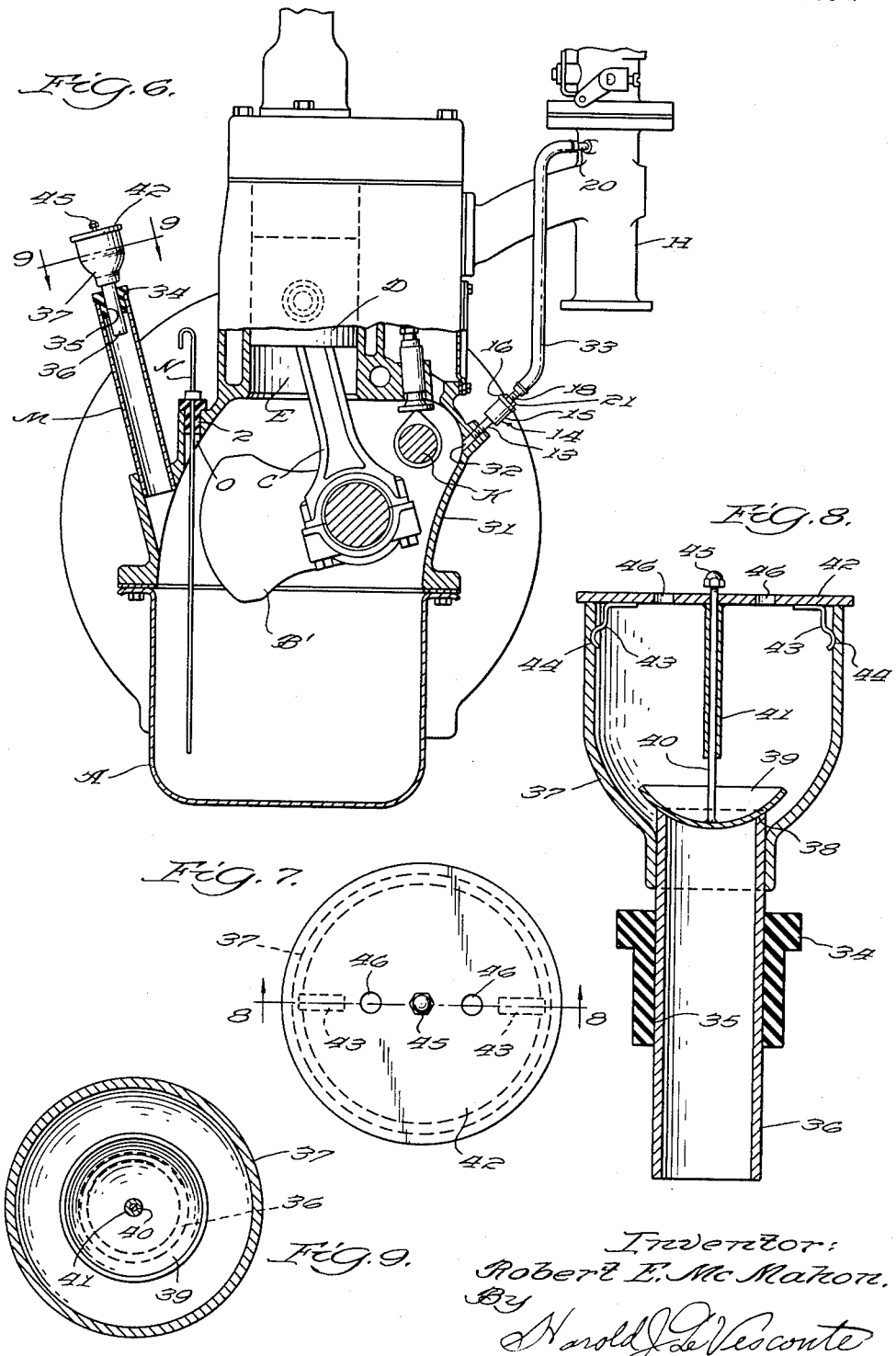

United States Patent Office

3,139,080
Patented June 30, 1964

3,139,080
INTERNAL COMBUSTION ENGINE
Robert E. McMahon, P.O. Box 704, Santa Monica, Calif.
Filed July 16, 1962, Ser. No. 210,112
16 Claims. (Cl. 123—119)

This invention relates to internal combustion engines and particularly to an improved means for eliminating the crankcase fumes thereof as an air pollution source.

It is now generally accepted that a principal cause of smog is fumes comprising hydrocarbon gases and vapors emitted from the crankcases of automotive engines, and the present invention has for its principal objective, the provision of improved means whereby these gases and vapors, hereinafter referred to as "fumes," are introduced into the fuel intake of the engine at a point and under conditions such that an advantageous pressure difference is established within the engine. This pressure differential is in direct relation to intake manifold pressure in a predetermined ratio and provides a number of important advantages both in the operation and protection of an engine.

The sealed system of crankcase fume utilization contemplated by this invention provides a practical control of crankcase fumes preventing their emission to the atmosphere from the vented openings normally present on an engine, namely the oil fill pipe, road draft tube and dip-stick opening by sealing such openings.

The invention also prevents the entrance of atmosphere into the crankcase area of the engine during operation, keeping the crankcase free of air borne contaminants and moisture laden air which normally deposits its contaminants and moisture therein, the moisture, as a result of condensation, causing damage by forming engine sludge when mixed with the lubricating oil, fumes and other induced contaminants common to engine crankcases. This sludge prevents the proper lubrication of vital engine parts, plugging important lubricating ports, bearing openings and causing excessive engine wear. Preventing entrance of atmosphere into the crankcase area of the engine greatly reduces the moisture content and resultant sludge making potential of an engine.

This invention provides improved crankcase fume utilization on all engines having a positive vacuum source and is of particular benefit installed on stationary engines such as inboard engines placed in boat holds in which crankcase fumes from an engine constitute both a health hazard and source of danger. The sealed engine crankcase fume utilization installed by this invention not only solves these problems but eliminates the need of expensive blowers commonly used both to force air into the crankcase on such engines and to free the hold from explosive and/or asphyxiating fumes.

Installation of this invention provides a controlled minus pressure differential in the engine crankcase on the underside of the piston area resulting in a reduction of pressure resistance and thus allowing for an improved working condition of the pistons and reduction of blowby gases normal to their operation. Reduction of this blowby further reduces contamination of the crankcase area and lubricants contained therein. This also results in a reduction of ring wear and improved lubrication of piston walls, greatly extending efficient engine performance.

According to the present invention, exclusion of the free flow of atmosphere into the crankcase and the establishment of a reduced atmospheric pressure therein by installation of this invention results in a condition favorable to improved engine carburation and a more complete fuel combustion as is evidenced by a substantial reduction in engine air pollutants emitted to the atmosphere via the exhaust systems on both new and past model engines.

Important also is the means provided by this invention to compensate for variations in engine sizes, cubic inch displacement, engine wear and geographic location of operation involving atmospheric pressure differences due to altitude. The metering adjustment valve provided in this invention allows a wide range of settings and selection of adjustment best suited to an engine for top performance, giving the invention broad application on both new and past model engines of varied makes, sizes and conditions.

The invention installed and adjusted to complement carburation for maximum efficiency of engine operation, requires no further maintenance and remains functional without further adjustment, rarely if ever requiring service or readjustment during the life of the engine. Should adjustment prove desirable a simple screw driver setting is provided making it as easy to reset as adjustment of a carburetor idle jet.

Another object of the invention is to provide a means for utilizing crankcase fumes of an internal combustion engine as a part of the fuel supply, which means is constructed and arranged to prevent an excessive positive pressure entering the crankcase during engine operation in the event of backfire.

Still another object of the invention is to provide a device of the above character in which the rate of flow of fumes from the crankcase to the fuel intake of the engine may be regulated.

A still further object of the invention is to provide a device in which the foregoing objectives are realized in practice and which is capable of ready installation on existing engines.

Still another object of the invention is to provide a device in which the foregoing objectives are realized in practice and which is capable of being built into the engine.

A still further object of the invention is to provide a device of the above character which is of simple construction, composed of few parts, of simple design, which is economical to manufacture and which is reliable in use.

Still another object of the invention is to provide a device of the above character which automatically isolates the interior of the crankcase when the engine is not operating.

Still another object of the invention is to provide means whereby the crankcase of the engine is protected at all times against air borne contaminants contacting the lubricant contained therein.

Figure 2:
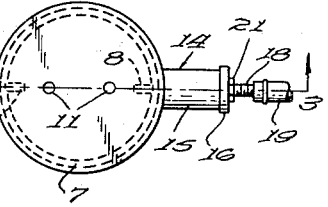
Figure 3:
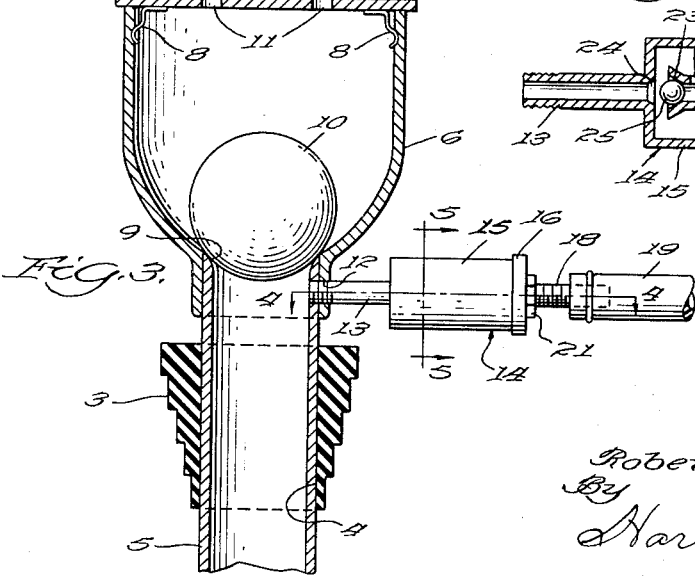
Figure 4:
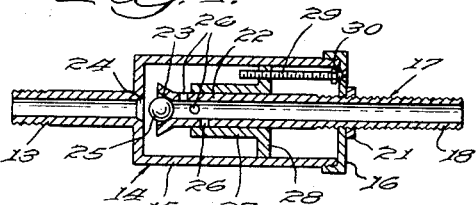
Figure 5:
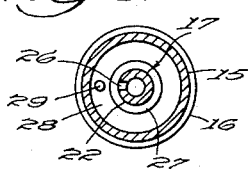

With the foregoing objects in view, together with such additional objects and advantages as may subsequently appear, the invention resides in the parts, and in the construction, combination and arrangement of parts described by way of example in the following specification of certain presently preferred embodiments of the invention, reference being had to the accompanying drawings which form a part of said specification, and in which drawings:

FIG. 1 is an end elevational view in section of an engine taken at the longitudinal center line of a cylinder and showing a device constituting a first embodiment of the invention applied as an attachment or accessory to the engine, FIG. 2 is an enlarged scale, top plan view of the portion of the first embodiment of the invention which is applied to the crankcase oil filler pipe, FIG. 3 is a further enlarged, medial longitudinal section taken on the line 3—3 of FIG. 2, FIGS. 4 and 5 are, respectively, still further enlarged sectional views taken on the lines 4—4 and 5—5 of FIG. 3 and showing details of interior construction of a combined checkvalve and metering valve unit of the invention, FIG. 6 is a side elevational view of an engine, partly in section, showing the invention applied thereby by incorporation in the engine structure, FIG. 7 is an enlarged scale, top plan view of the check-valve component which is incorporated in the crankcase oil fill tube, FIG. 8 is a longitudinal medial section taken on the line 8—8 of FIG. 7, and FIG. 9 is a transverse sectional view taken on the line 9—9 of FIG. 6.

Referring first to FIGS. 1–5 of the drawings, the first embodiment of the invention is shown as applied to an engine including a crankcase defined by an oil pan A and the under side of the engine block B in which the crankshaft B' is rotatable, said shaft being rotated by a connecting rod C connected to a piston D reciprocable in a cylinder E formed in the block B said cylinder terminating in a combustion chamber F. The combustion chamber is intermittently supplied with combustible fuel from a carburetor G connected by a manifold H to the inlet port I and said inlet port is opened and closed by an inlet valve J actuated by a cam shaft K. Additionally, the crankcase is provided with a breather or road draft tube L formed in the wall of the block B and the crankcase defining walls of the block are also provided with openings for an oil fill tube M and for a dip stick N insertable and removable in an opening O in the crankcase. In the adaptation of the engine to the present invention, it is necessary to close the road draft tube, if present, as will be presently explained. Normally, also, the oil fill tube and the opening through which the dip stick enters are not closed and in the present invention, they are provided with seals as will also be explained as the description of the invention proceeds.

The invention is concerned with the salvage and utilization of the fuel values of the crankcase fumes deriving both from atomization of lubricating oil mechanically by the rapid rotation of the crankshaft and the movement of the piston rods together with such fumes as are derived from unburned fuel escaping into the crankcase and the lighter fractions of the lubricating oil being vaporized by the heat of the engine. As these fumes form, they are transmitted by means of the present invention to the intake manifold and to prevent the escape of these fumes, the road draft tube L is closed by a plug 1 and the dip stick opening hole is similarly sealed by a resilient plug 2 which is mounted on and closely surrounds the dip stick adjacent the handle end. The oil filler tube M at the outer end thereof is provided with a closure comprising a resilient plug 3 having an axial bore 4 extending therethrough and preferably having an outer surface comprising a series of decreasing diametral dimensions whereby a single plug may be employed to accommodate various sizes of oil fill tubes as may be found on different makes and sizes of engines.

Tightly received in and extending through the axial bore 4 of the plug 3 is the nipple end 5 of the relief valve cage 6 of larger diameter than the nipple end 4 said valve cage having a removable cover 7 detachably secured by spring detents 8, 8 engaging complementary notches in the inner wall of the relief valve cage 6. The end of the nipple portion 5 within the cage is outwardly flared to form a seat 9 for a valve element comprising a light weight ball 10 which thus normally seals the nipple 5 against allowing crankcase fumes from escaping. The ball 10 is, however, to be capable of being unseated upon a predetermined increase in crankcase pressure above atmosphere. When this ball is unseated, the fumes escape past the ball and then through openings 11 in the cover 7.

A transverse, threaded hole 12 extends through the valve cage 6 and nipple 5 at the juncture with each other adjacent to the outer end of the plug 3 and threadedly received in the hole 12 is the inlet nipple end 13 of a combined check valve and metering valve unit 14. The valve unit 14 includes an elongated, hollow, cylindrical body 15 disposed in axial alignment with the nipple 13 which projects from one end thereof and said body is provided with a removable cover 16 threadedly engaging the opposite end thereof. Threadedly mounted in the cover 16 and disposed in the axial line thereof is the outlet nipple and metering valve component 17, the threaded outer end 18 thereof affording means for engagement with a hose 19 which extends to a nipple 20 carried by the intake manifold H and disposed therein closely to the mounting flange for the carburetor G. A lock nut 21 serves to secure the component 17 in adjusted position in the cover 16.

Within the body member 15, the nipple and metering valve component 17 extends almost to the opposite end of the body 15 and forms a component 22 of a metering valve means and it terminates in a flared end forming a checkvalve seat 23. The bore extending through the inlet nipple 13 terminates within the body in a tapered valve seat 24 and a check ball 25 is loosely retained between the valve seats for seating engagement with one or the other of the valve seats 23 and 24 as will presently be explained. The portion 22 of the outlet nipple adjacent to the said flared end is provided with a series of longitudinally spaced radial holes 26 and slidably mounted on the exterior of this portion 22 is a sleeve 27 having a flange at the end thereof adjacent to the cover 16 which closely fits the interior of the body 15. The cover 16 is provided with a screw 29 loosely secured therein by a lock nut 30 and the threaded body of the screw threadedly engages a hole in the flange 28 so that turning the screw shifts the flange and sleeve along the portion 22 of the outlet nipple and covers or uncovers one or more of the holes 26, thus regulating the amount of fumes that can be drawn through this valve unit in response to a given differential of pressures between the intake manifold and the crankcase. The ball 25 responds to a lighter positive pressure in the crankcase than that which is great enough to unseat the ball 10 so that at the lighter ranges of positive pressure in the crankcase, there is automatic scavenging of crankcase fumes.

Under normal operating conditions, the metering valve portion of the device is designed to meter and maintain a minimum negative pressure in the crankcase even when in the completely closed position, of between one and two inches of mercury. The most efficient engine operation and crankcase fume utilization will generally be obtained on engines in good condition at a slightly higher crankcase pressure differential usually of four to five inches of mercury setting at warm engine idle. The greatest increase in engine r.p.m.s becomes apparent in the 1000 r.p.m. range of engine operation and the moderate increase in r.p.m. at idling speed may warrant slight closing of the carburetor idling jet or set back of the throttle adjustment at time of installation, or both, but no more than this.

In operation, the crankcase pressure varies in response to the varied changes of engine operation and driving conditions and is directly responsive to the resultant intake manifold pressure changes. Under actual road driving conditions pressure differences in the crankcase fluctuate widely changing from less than one inch of mercury on rapid acceleration to in excess of six or seven inches of mercury on de-acceleration with the engine setting of five inches of mercury at warm engine idle. Only at idle speed is a more or less constant pressure difference maintained for any period of time in the engine crankcase. The fumes flowing from the crankcase through the unit 14 will maintain the ball seated on the seat 23 in the end of the outlet nipple 17 as shown in FIG. 4 so that the flow of crankcase fumes will be that which is permitted by the adjustment of the sleeve 27 and the number of the holes 26 or portion thereof which is left open by such adjustment. When, however, there is a positive pressure in the intake manifold, as for instance, in the case of a backfire, the ball engages the seat 23 to prevent the excess pressure from reaching the engine crankcase. The fact that the ball 10 serves to relieve positive pressure in the crankcase has already been mentioned, it being noted that the negative pressure in the crankcase serves to cause atmospheric pressure to hold that ball securely seated.

It is to be noted that this embodiment of the invention is simple in design and can be readily applied to existing engines, it being merely necessary to effectively seal the road draft tube and dip stick opening in the engine crankcase the oil fill tube being sealed by the means above described and to connect the portion of the device mounted thereon to the intake manifold or any comparable positive vacuum source. One end of the fume transmitting device is inserted in the oil filler tube in place of the usual removable cover therefor and the other end is attached to the nipple which is applied to the intake manifold. To replenish the oil in the crankcase, the unit placed therein is removed from the end of the filler tube M, the flexibility of the hose 19 permitting this to be done. This complete sealing of the crankcase preserves the integrity of the air-fuel ratio established by carburetor adjustment.

By means of this device the fumes developed in the crankcase area are transmitted to the intake manifold and into the combustion chambers of the engine resulting in a substtantial reduction of the unburned hydrocarbons in the engine exhaust. The effects are increased engine r.p.m. for a given throttle opening which is evidenced by a noticeable increase in miles per gallon achieved as well as almost complete elimination of sludge from the lubricating oil wherefore, oil changes and oil consumption are appreciably reduced.

Referring next to FIGS. 6–9, there is shown an embodiment of the invention as incorporated into the engine structure, it being noted that those elements of the engine which are not altered are given the same identifying letters as in FIG. 1. Basically, this embodiment differs in that the conventional road draft tube is eliminated and in lieu thereof a port is formed in the wall of the engine block which borders the upper portion of the crankcase cavity and this port is connected to the intake manifold with the metering and checkvalve unit of the first embodiment interposed therein and further, in that the closure for the oil fill tube need only have the pressure relief valve means including a closure element adapted only for that particular diameter of tube instead of the stepped configuration previously disclosed.

Specifically, the engine block 31 is substituted for the engine block B of the first embodiment, said substituted block being altered in that the port for attachment of the road draft tube is eliminated and a port 32 for attachment of the inlet nipple 13 of the check valve and metering valve unit 14 is provided. Alternatively, the port 32 may, of course, be the port to which the road draft tube was formerly connected. The outlet nipple 18 of that unit may be connected by a hose 33 or by a rigid conduit means to the nipple 20 in the intake manifold H. The internal construction of unit 14 is the same as previously described and, accordingly, need not be repeated here. Also, obviously, the checkvalve and metering valve unit 14 may be interposed between the hoses 19 or 33 and the manifold if installation considerations should make that arrangement desirable.

The oil fill tube M is closed by a resilient plug 34 having a single diameter outer surface to engage the interior of the tube. The plug is provided with an axial bore 35 extending therethrough in which the nipple or tube component 36 which carries the pressure relief valve cage 37 exteriorly of the plug is tightly received. Within the valve cage, the end of the tube 36 is tapered to form a valve seat 38 which is engaged by the spherical segmental surface of a sheet metal valve member 39, said valve member being fixed to the lower end of the guide rod or stem 40 which is disposed in the axial line of the valve cage and tube and which is guided for reciprocation in a sleeve 41 depending from the under surface of a cover 42; said cover being detachably secured to the outer end of the valve cage by detent springs 43, 43 fixed to the under side of the cover and which engage complementary grooves 44, 44 in the inner wall surface of the valve cage. The valve stem 40 extends beyond the outer surface of the cover 42 and carries a nut 45 which thus maintains the valve member and stem in assembly with the cover 42. As in the first embodiment, this relief valve 39 is of such weight that a predetermined increase in the pressure within the crankcase cavity above that which will unseat the ball 25 will unseat this valve allowing the released fumes to escape into the valve cage and thence through holes 46 in the cover 42 to atmosphere. It will be understood that this valve and valve cage is equally usable with the first embodiment of the invention.

Thus there has been provided a means for conserving fumes in an engine crankcase and utilizing them for the production of power without, at the same time, subjecting the crankcase cavity to the effect of excessive vacuum. Experience has shown that by the use of this device the tendency of fuel escaping into the crankcase as well as prevention of oxidation of the lubricating oil and the exclusion of moisture or other air-borne contaminants precludes the formation of sludge in the lubricating oil and greatly lengthens the useful life thereof. Accordingly, engine maintenance is correspondingly reduced. Additionally, the use of these fumes as a portion of the fuel fed to the combustion chambers of the engine decreases the amount of fuel required with resultant noticeable increase in the miles per gallon of fuel achieved by vehicles so equipped. To state the advantages of the invention another way, all of the air entering the carburetor intake is utilized in combustion, since even if some should be included in gases which enter the crankcase past the pistons it will not escape through the road draft tube and will be re-directed into the fuel intake. Additionally, no outside air is permitted to enter the crankcase, wherefore, dilution of the gases or fumes thus recycled is prevented. Moreover, when the engine is not operating, the valves and seals maintain the crankcase sealed against contamination as from the oxidizing effects of atmosphere, airborne dust and moisture condensed out of the atmosphere.

While in the foregoing specification there has been disclosed certain presently preferred embodiments of the invention, the invention is not to be deemed to be limited to the details of construction thus disclosed by way of example, and it will be understood that the invention includes as well all such changes and modifications in the parts, and in the construction, combination and arrangement of parts as shall come within the purview of the appended claims.

I claim:

1. In an internal combustion engine having a combustion chamber supplied by an intake manifold means, and a crankshaft housed by a crankcase and rotated by a reciprocating piston and connecting rod means, the combination of crankcase fume utilization means comprising means effective to prevent the emission to atmosphere of crankcase fumes and to seal said crankcase against the entrance of air or airborne matter thereinto, a normally closed, pressure responsive valve means disposed in communication with the interior of said crankcase and biased to open only in the event that pressure within the crankcase exceeds by a predetermined magnitude the atmospheric pressure at the altitude at which the engine is situated, conduit means connecting the interior of said crankcase with said intake manifold means for conducting crankcase fumes to said intake manifold means, a flow restricting orifice interposed in said conduit means, and a normally closed checkvalve means while responsive to intake manifold vacuum to permit crankcase fumes to pass therethrough en route to said intake manifold means in said conduit means constantly effective to prevent flow of air and gas from the intake manifold into said crankcase through said conduit means.

2. An internal combustion engine as claimed in claim 1 in which said pressure relief valve means and said checkvalve means operate automatically to seal the crankcase against entry of foreign matter when the engine is inoperative.

3. An internal combustion engine as claimed in claim 1 in which said pressure relief valve means is biased to open only when the magnitude of crankcase pressure is greater than can be relieved through said checkvalve means and said orifice.

4. An internal combustion engine as claimed in claim 1 in which said flow restricting orifice is adjustable to vary the rate of flow therethrough.

5. An internal combustion engine as claimed in claim 1 in which said crankcase is provided with an opening for supplying lubricating oil and in which said pressure relief valve means is mounted in said opening as a removable closure means therefor.

6. An internal combustion engine as claimed in claim 1 in which said conduit means has one end thereof disposed in direct communication with an opening having communication with the interior of the crankcase and the other end thereof communicating with the interior of said intake manifold.

7. An internal combustion engine as claimed in claim 2 in which said checkvalve means is biased to be unseated by a lesser crankcase pressure than required to unseat said pressure relief valve means.

8. An internal combustion engine as claimed in claim 5 in which the crankcase connected end of said conduit means is connected to said relief valve means upstream of the valve element of said relief valve means.

9. A device for preventing the emission to atmosphere of the crankcase fumes of an internal combustion engine having intake means for gaseous fuel and having a crankcase provided with an opening through which lubricating oil is supplied to the crankcase; said device comprising a valve cage having a nipple component insertable in the crankcase oil supply opening and having sealing means cooperating with said nipple component to form a removable closure for the crankcase oil supply opening, said nipple component affording communication between the interior of the crankcase and the interior of said valve cage, an opening in said valve cage affording communication between the interior of said valve cage and atmosphere, a valve seat in said valve cage interposed between the end of said nipple component remote from said valve cage and said opening in said wall of said valve cage, a pressure responsive valve element normally seated on said valve seat and biased to open only in the event that pressure within the crankcase exceeds by a predetermined magnitude the atmospheric pressure at the altitude at which the engine is situated, conduit means connecting the interior of said valve cage at the side of said valve seat adjacent the crankcase interior with the engine fuel intake means, a flow restricting orifice in said conduit means, and a normally closed checkvalve in said conduit means constantly effective to prevent the flow of air and gas from the engine fuel intake means into the crankcase through said conduit means.

10. A device as claimed in claim 9 in which said pressure relief valve means and said checkvalve means operate automatically to seal the engine crankcase against the entry of foreign matter when the engine is inoperative.

11. A device as claimed in claim 9 in which said pressure relief valve means is biased to open only when the magnitude of crankcase pressure is greater than can be relieved through said checkvalve means and said orifice.

12. A device as claimed in claim 9 in which said flow restricting orifice is adjustable to vary the rate of flow therethrough.

13. A device as claimed in claim 9 in which said checkvalve means is biased to be unseated by a lesser crankcase pressure than required to unseat said pressure relief valve means.

14. A device as claimed in claim 9 in which said conduit means is flexible to permit removal and replacement of said valve cage and nipple as a unit incident to supply of lubricating oil to the engine crankcase.

15. In an internal combustion engine having a combustion chamber supplied by an intake manifold means, a crankshaft housed by a crankcase and rotated by a reciprocating piston and connecting rod means and further having a dip stick removably mounted in an opening in a wall defining the crankcase, the combination of crankcase fume utilization means comprising means effective to prevent the emission to atmosphere of crankcase fumes and to seal the crankcase against the entrance of air or airborne matter thereinto and including sealing means interposed between the dip stick and the opening in which the dip stick is mounted, a normally closed, pressure responsive valve means disposed in communication with the interior of said crankcase and biased to open only in the event that pressure within the crankcase exceeds by a predetermined magnitude the atmospheric pressure at the altitude at which the engine is situated, conduit means connecting the interior of said crankcase with said intake manifold means for conducting crankcase fumes to said intake manifold means, a flow restricting orifice interposed in said conduit means and a normally closed checkvalve means in said conduit means constantly effective to prevent flow of air and gas from the intake manifold means into said crankcase through said conduit means while responsive to intake manifold vacuum to permit crankcase fumes to pass therethrough en route to said intake manifold means.

16. In an internal combustion engine having a combustion chamber supplied by an intake manifold means, and a crankshaft housed by a crankcase and rotated by a reciprocating piston and connecting rod means, the combination of means sealing said crankcase against the entrance of air or airborne matter thereinto, a normally closed, pressure responsive valve means disposed in communication with the interior of said crankcase and biased to open only in the event that pressure within the crankcase exceeds by a predetermined magnitude the atmospheric pressure at the altitude at which the engine is situated, conduit means connecting the interior of said crankcase with said intake manifold means, a flow restricting orifice interposed in said conduit means, and a normally closed checkvalve means in said conduit means constantly effective to prevent flow of air and gas from the intake manifold means into said crankcase through said conduit means; said crankcase being provided with an opening for supplying lubricating oil to the crankcase and in which opening said pressure relief valve is mounted as a removable closure means therefor; the crankcase connected end of said conduit means being connected to said relief valve means upstream of the valve element of said relief valve means and said conduit means being flexible to permit said relief valve means to be removed from and replaced in said opening incident to replenishment of lubricating oil in said crankcase.

References Cited in the file of this patent

UNITED STATES PATENTS 1,517,326    Watkins  ---------------- Dec. 2, 1924